United States Patent [19]

Miller

[11] 4,404,669
[45] Sep. 13, 1983

[54] STYLUS ASSEMBLY
[75] Inventor: Michael E. Miller, Indianapolis, Ind.
[73] Assignee: RCA Corporation, New York, N.Y.
[21] Appl. No.: 341,144
[22] Filed: Jan. 20, 1982
[51] Int. Cl.³ ........................... G11B 9/06; G11B 3/46
[52] U.S. Cl. .................................. 369/170; 29/25.41; 29/854
[58] Field of Search ............... 369/126, 151, 170, 171, 369/172, 173; 29/25.42, 854, 857, 860

[56]  References Cited
U.S. PATENT DOCUMENTS

| | | | |
|---|---|---|---|
| 2,699,470 | 1/1955 | Koren | 179/100.41 |
| 3,699,268 | 10/1972 | Miller | 179/100.41 |
| 3,952,145 | 4/1976 | Allen | 178/6.6 R |
| 3,952,147 | 4/1976 | Leedom | 178/6.6 R |
| 4,030,124 | 6/1977 | Allen | 358/128 |
| 4,038,682 | 7/1977 | Allen | 358/128 |
| 4,113,981 | 9/1978 | Fujita et al. | 174/88 |
| 4,337,536 | 6/1982 | Taylor | 369/126 |

Primary Examiner—Steven L. Stephan
Attorney, Agent, or Firm—E. M. Whitacre; J. S. Tripoli; E. P. Herrmann

[57] ABSTRACT

Assembly of a video disc signal recovery stylus apparatus is facilitated by utilizing a stylus holder having a vertical cylindrical end. A conductive leaf spring is inserted in the cylinder followed by a conductive torroidal elastomer. The stylus is then inserted in a hole in the elastomer, all of the parts being held in place by the compressive forces exerted by the elastomer. The second end of the leaf spring is secured to a terminal element which is releasably secured to the stylus arm to provide mobility of the foregoing subassembly during manufacturing. When the subassembly is inserted into a cartridge the terminal element is detached from the stylus arm and inserted into a conformal cavity in the cartridge affording accurate positioning and orientation of the leaf spring.

11 Claims, 7 Drawing Figures

STYLUS ASSEMBLY

BACKGROUND OF THE INVENTION

This invention relates to apparatus useful in applications such as a video disc player and more particularly to the stylus assembly for recovering the recorded signal from a disc record.

Information is recorded on video discs in generally circular tracks or a continuous spiral track having an extremely small pitch, e.g., 10,000 tracks per inch. Those systems which employ a track following stylus for signal recovery require a pickup stylus with concomitantly small dimensions. In order that the stylus faithfully track the information track, the dynamics of the stylus assembly normal to the disc must be designed to relatively critical tolerances. Typically the stylus is rigidly mounted to the free end of a stylus arm of low mass. The opposite end of the stylus arm is compliantly mounted to a carriage assembly and stylus-disc pressure is provided by a leaf spring arranged in an arc between the stylus and the carriage assembly.

The capacitive disc player systems utilize a stylus having an electrode adherent to one of its faces which is generally normal to the disc. Electrical contact is made to this electrode via the leaf spring. The leaf spring has a hole in one end which is designed to slide over the stylus. The leaf spring is then soldered, welded, or glued with conductive cement to the stylus electrode. Alternatively the hole in the leaf spring may be arranged with tines so that it is self retentive to the stylus. In addition, the leaf spring is staked to the stylus arm to preclude imposing twisting forces, etc. on the stylus body.

It has been found, however, that compliantly securing the stylus to the stylus arm enhances tracking of the disc. In order to achieve this result, it is required that the leaf spring be indirectly connected to the stylus electrode. This in turn imposes contraints on the sequence of assembly of the recovery apparatus during manufacturing operations. The present invention affords both a mounting means for limited decoupling of the stylus from the stylus arm and for facilitating assembly of the recovery apparatus.

BRIEF SUMMARY OF THE INVENTION

The present stylus assembly includes a longitudinal stylus arm of relatively low mass arranged for compliant coupling at a first end thereof to a stylus translating carriage or to a cartridge enclosure. The second end of the stylus arm is fitted with a cylindrical member, the axis of which is generally normal to the disc record when in the normal play position. The leaf spring is inserted into the cylindrical member along the cylinder wall nearest the stylus arm. A torroidal conductive elastomer is inserted into the cylinder compressively securing the leaf spring. The stylus is compressively inserted in the center of the torroidal elastomer which effects electrical contact between the stylus electrode and the leaf spring.

The leaf spring is laid along the stylus arm and secured thereto proximate the second end. The free end of the leaf spring is attached to a terminal element which is releasably secured to the stylus arm. The terminal element is designed for reception in a conformal mounting cavity when the first end of the stylus arm is mounted to the carriage or to the cartridge. During assembly the terminal element may serve as a handle for the stylus arm subassembly.

DETAILED DESCRIPTION OF THE INVENTION

Figure 1B:
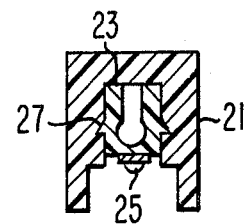
FIGS. 1, a–d, is a pictorial representation of the stylus arm subassembly embodying the present invention.
Figure 1A:
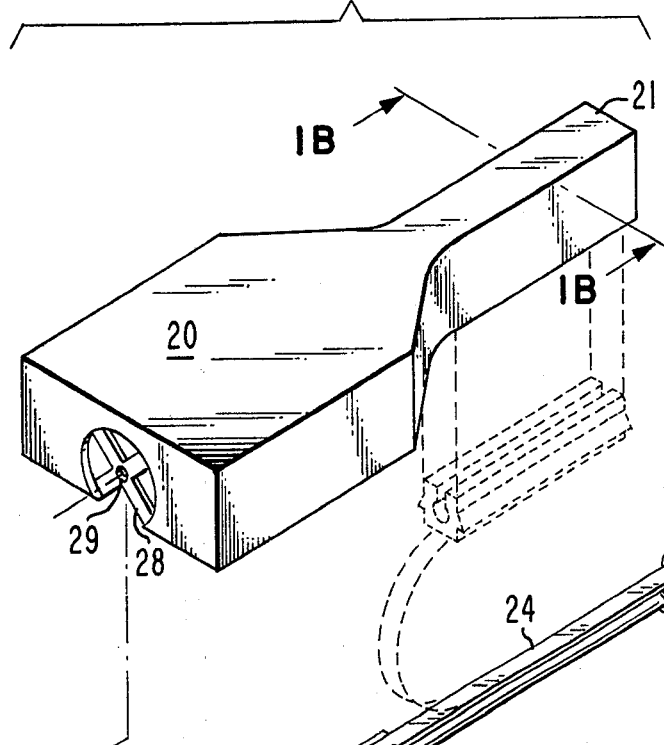

FIG. 1a illustrates a stylus arm subassembly comprising the stylus arm 22, leaf spring 24, stylus 26, leaf spring terminal element 23 and a cartridge body 20 into which the subassembly may be installed. Typically the subassembly (with or without the stylus) is assembled prior to insertion in the cartridge.

The stylus arm 22 is typically a thin walled, lightweight aluminum tube. A stylus holder 31 is attached to one end of the tube. A resilient electrically conductive leaf spring 24 is secured to the stylus holder and is electrically connected to the stylus electrode. The leaf spring 24 is laid along the stylus arm 22 and secured to a terminal element 23 which is releasably snapped onto the stylus arm. The leaf spring is secured in two places to insure the parallel orientation of the leaf spring and the stylus arm. This is a desirable feature in that upon subsequent installation of the stylus arm subassembly in the cartridge body 20 the relative orientation or alignment of the stylus arm in the cartridge is facilitated simply by insertion of the terminal element into a molded receptacle.

The subassembly is installed by fixing the end of the stylus arm opposite the stylus to a compliant suspension 28, e.g., by inserting it through a hole therein. The terminal strip 23 is disengaged from the stylus arm and inverted to deform the leaf spring in an arc. The terminal element is thereafter inserted into a conformal chamber or cavity preformed in the cartridge and secured thereto. Note that the terminal element may be fitted with tabs (slots) 27 and the cartridge cavity with slots (tabs) for holding the terminal element 23 in place. See FIG. 1b which shows a cross-section A-A of the cartridge with the terminal element 23 in place. The cartridge 21 is formed to accept the terminal element 23 in a relatively precise position. The tabs 27 on the terminal element 23 engage slots in the cartridge for retaining the terminal element. Note that the element cross-section is generally horseshoe-shaped with the open end up. The horseshoe shape permits the legs of the element 23 to be squeezed together to allow passage of the tabs 27 into the conformal cavity.

Figure 1C:
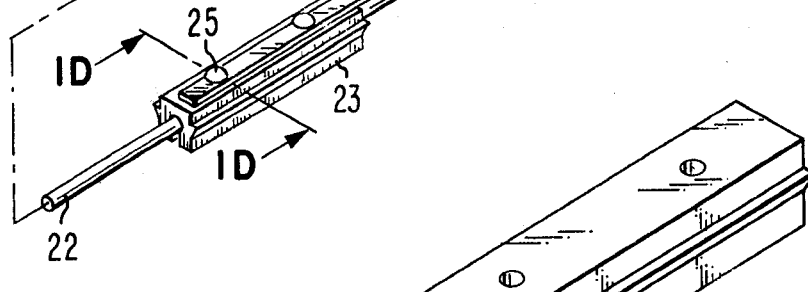
Figure 1D:
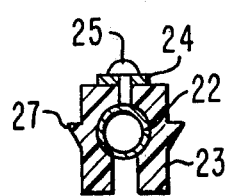

FIGS. 1c and 1d show expanded views of the terminal element 23 in perspective and a cross-section of the terminal element 23 when mounted to the stylus arm. The element 23 is designed for self-retention to the stylus arm. This is accomplished by forming the element in a "U" shape longitudinally with the inner portion of the "U" slightly larger than at the opening of the "U". Preferably when the element engages the stylus arm they will be in compression to prevent rotation of the element about the stylus arm and to preclude it from sliding forward.

The means utilized to secure the leaf spring 24 to the element 23 may include a raised rivet 25 for example, for making contact to further electrical circuitry when the cartridge 20 is placed in a disc player. See for example U.S. Pat. No. 4,080,625.

For certain systems it may be desirable to provide for some adjustment of the leaf spring once the stylus arm subassembly is installed in the cartridge. For these systems the leaf spring 24 may be secured to the element 23 at only one point by a rotatable ball and socket arrangement as described by Taylor et al. in U.S. Pat. No. 4,030,123.

Figure 2A:
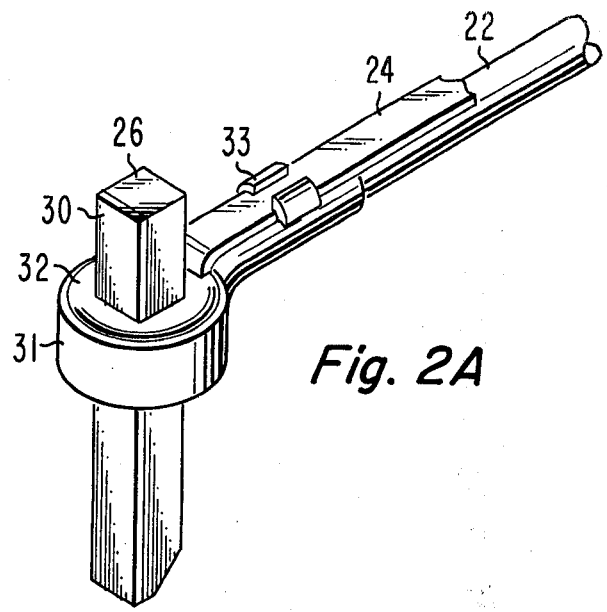
FIGS. 2, a and b, is a detailed drawing and cross-section of the stylus mounting structure.
Figure 2B:
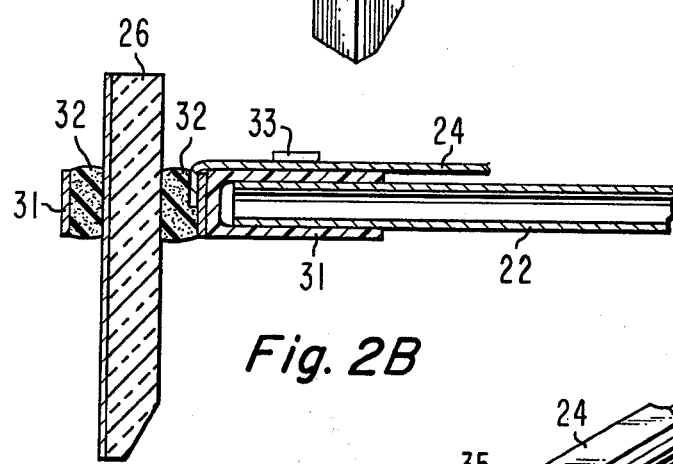

FIGS. 2a and 2b illustrate the stylus mounting elements in detail. The stylus holder 31 having a generally cylindrical end portion has a tubular stem for mounting about the stylus arm 22. Alternatively, the stem may be of smaller diameter for insertion into the end of the tubular stylus arm. The axis of the cylindrical end of the stylus holder 31 is shown to be generally perpendicular to the longitudinal axis of the stylus arm 22. Depending on the length of the stylus arm and the general orientation of the stylus arm assembly with respect to a disc record in a disc player, it may be desirable to offset the cylindrical axis from the perpendicular position to achieve a proper stylus-disc angular relationship, e.g., with respect to FIG. 2b the cylinder axis might better be rotated clockwise about 8-12 degrees.

The stylus holder 31 is formed from a non-conducting material to preclude electrical connection of the stylus 26 to the stylus arm 22. Preferably the stylus holder will be of a thermally deformable material, e.g., plastic to facilitate securing the leaf spring 24 thereto. By locally heating and compressing such a material, tabs or ears 33 may be formed to clamp and rigidly secure the leaf spring.

The end of the leaf spring is positioned inside the cylinder along the cylinder wall adjacent the stem of the holder. A conformal cylindrical or torroidal elastomer 32 is inserted into the cylinder to hold the end of the leaf spring in compression. The stylus 26 having an electrode 30 thereon is then inserted through the center of the elastomer. The elastomer is dimensioned so that the stylus and the leaf spring will be compressively retained in the holder while permitting a limited amount of stylus translation (mechanical decoupling) in the direction of the axis of the cylinder.

The elastomer 32 is comprised of a conductive material to make electrical connection between the stylus electrode 30 and the leaf spring 24. Examples of suitable elastomers include butyl rubber loaded with carbon black and silicone loaded with silver. Nominally the conductance of the material may be relatively low since the stylus electrode is part of a capacitive transducer. A particular example of a suitable commercial product is the conductive silver/silicone elastomer "Consil-II" manufactured by TECKNIT of Cranford, N.J. 07016. The conductive elastomer may also be an adhesive material which is applied to the cylinder in a viscous form and rendered torroidal by, for example, insertion of the stylus therein.

The use of a cylindrical stylus holder and an elastomer insert serves two functions. First it simplifies the process of assembling successive elements, i.e., the stylus arm is inserted into the stylus holder stem—the leaf spring and then the elastomer is inserted into the cylinder—and finally the stylus is inserted into the elastomer. Secondly, the elastomer provides some decoupling of the stylus from the stylus arm. The entire stylus arm assembly is compliantly mounted in the cartridge body to permit vertical stylus motion to accommodate relatively large perturlocations of disc flatness (e.g., to follow a warped disc). However, the mass and inertia of the assembly and pressure produced by the leaf spring impede the stylus from following relatively small vertical imperfections in the disc. The elastomer permits the stylus to ride over such imperfections independent of the stylus arm motion.

Figure 3:
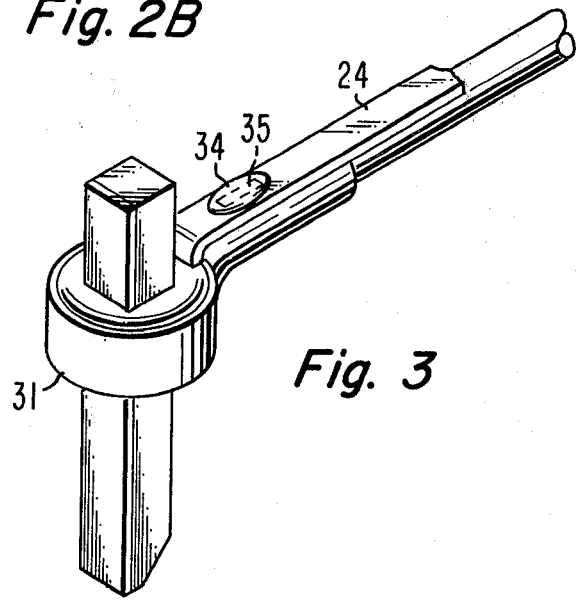
FIG. 3 is a prespective view of the stylus mounting structure with alternate means for securing a leaf spring thereto.

FIG. 3 illustrates an alternate method for securing the leaf spring 24 to the stylus holder 31. In this embodiment the holder is formed having an integral protrusion on the upper surface of the tubular stem. The leaf spring is provided with an opening 35 through which the protrusion is mated. The leaf spring rests on the holder with the protrusion extending above the leaf spring. The protrusion is then flattened downward onto the leaf spring by thermal and compressive means producing the buttom 34 to hold the leaf spring in place.

What is claimed is:

1. An assembly for use in a player apparatus for recovering signal from a high density disc record, said assembly comprising:
    a longitudinal stylus arm of relatively low mass;
    a stylus holder secured to a first end of said stylus arm;
    a stylus including a conductive electrode, said stylus being secured in said stylus holder;
    a conductive leaf spring having a first end connected for making electrical connection to said electrode and fixedly secured proximate the first end of said stylus arm wherein the length of said leaf spring is arranged to lie proximate and parallel to said stylus arm;
    a terminal element releasably secured to said stylus arm and positioned proximate a second end of said leaf spring; and
    means for securing the second end of said leaf spring to said terminal element;
    wherein said terminal element serves to hold the leaf spring in fixed relation to the stylus arm and is adapted to be detached from the stylus arm and attached to a predetermined location in said player apparatus to position the second end of said leaf spring in said predetermined location.

2. The assembly set forth in claim 1 wherein the terminal element is a longitudinal generally "U" shaped element, the interior of the "U" being dimensioned to fit over the stylus arm and hold the element to the stylus arm by compression therebetween.

3. The assembly set forth in claim 1 or 2 wherein the terminal element is formed from a polymer material.

4. The assembly set forth in claim 1 or 2 wherein the stylus holder comprises:
    a rigid element having a generally cylindrical end portion and a stem portion connected generally normal to the axis of said cylinder, said stem portion being designed for rigid coupling with the stylus arm; and
    a generally cylindrical conductive elastomer having a central cavity and dimensioned to fit coaxially in the cylindrical portion of said rigid element for compressively holding the first end of the leaf spring to the interior cylinder wall, for compressively holding said stylus coaxially in its central cavity, and for providing electrical connection between said stylus electrode and said leaf spring.

5. The assembly set forth in claim 4 wherein the elastomer comprises silicone loaded with silver.

6. The assembly set forth in claim 4 wherein the stem portion of said rigid element is tubular and dimensioned to receive the first end of the stylus arm therein.

7. The assembly set forth in claim 4 wherein the stylus arm is tubular and the stem portion of said rigid element is dimensioned for reception into the first end of said tubular stylus arm.

8. The assembly set forth in claim 4 wherein the stem portion of said rigid element includes means for securing said leaf spring thereto.

9. A stylus arm unit for a disc record player comprising:
   a cartridge having walls defining an enclosure;
   a longitudinal stylus arm;
   means proximate a first end of said cartridge for compliantly suspending a first end of the stylus arm within said enclosure;
   a stylus holder having a generally cylindrical end portion and having a stem portion external thereto, the axis of the stem portion being generally perpendicular to the axis of the cylinder;
   means for securing the stem portion of the stylus holder to a second end of the stylus arm, the axis of the stem and stylus arm being generally colinear;
   a longitudinal conductive leaf spring;
   means for securing a first end of the leaf spring to a second end of said cartridge within said enclosure;
   a conductive, generally cylindrical elastomer, said elastomer having a central cavity and being inserted in the generally cylindrical portion of the stylus holder for compressively retaining a second end of the leaf spring to the inner cylinder wall of the stylus holder; and
   a longitudinal signal recovery stylus having a conductive electrode on a longitudinal face thereof, said stylus being inserted and compressively held coaxially in the central cavity of the cylindrical elastomer, said elastomer effecting electrical connection between the stylus electrode and the leaf spring.

10. The stylus arm unit set forth in claim 9 wherein the means for securing the first end of the leaf spring comprises a longitudinally generally "U" shaped element which is releasably secured to the stylus arm during stylus-stylus arm assembly and detached therefrom for installation of the stylus-stylus arm assembly into the cartridge, the cartridge having a conformal chamber in its second end for receiving and securing said "U" shaped element in a predetermined position such that the leaf spring forms an arc tending to expel the second end of the stylus arm out of the cartridge enclosure.

11. A holder for securing a generally longitudinal stylus to a supporting arm and for providing electrical contact between an electrode on said stylus and a conductive leaf spring, said holder comprising:
   an element having a stemlike member for attaching said element to one end of said supporting arm said element further having a generally cylindrical member integral with said stemlike member, an axis of the cylindrical member being generally perpendicular to an axis of the stemlike member;
   a generally cylindrical conductive elastomer having an inner cavity and being dimensioned for coaxial insertion in said cylindrical member, said cylindrical member and said cylindrical elastomer being adapted to receive at least a portion of said leaf spring extending inside the cylindrical member along the cylinder wall and secured in compression to the holder by said cylindrical elastomer, the inner cavity of the cylindrical elastomer being dimensioned for securing a stylus coaxially inserted therein in compression, and for providing electrical connection between the stylus electrode and the leaf spring; and
   means integral to the stemlike member for securing the leafspring thereto.

* * * * *

UNITED STATES PATENT AND TRADEMARK OFFICE
CERTIFICATE OF CORRECTION

PATENT NO. : 4,404,669
DATED : Sept. 13, 1983
INVENTOR(S) : Michael E. Miller

It is certified that error appears in the above-identified patent and that said Letters Patent is hereby corrected as shown below:

Column 4, line 22  "a longitudinal stylus arm of relatively low mass;" should be --a longitudinal stylus arm;--.

Signed and Sealed this

Seventeenth Day of January 1984

[SEAL]

Attest:

GERALD J. MOSSINGHOFF

Attesting Officer  Commissioner of Patents and Trademarks